United States Patent [19]

Minghetti et al.

[11] Patent Number: 5,521,243
[45] Date of Patent: May 28, 1996

[54] ACRYLIC SHEET HAVING UNIFORM DISTRIBUTION OF COLORING AND MINERAL FILLER BEFORE AND AFTER THERMOFORMING

[75] Inventors: Ettore Minghetti; John E. Eitel; Carol A. Wetter, all of Boone County, Ky.

[73] Assignee: Aristech Chemical Corporation, Pittsburgh, Pa.

[21] Appl. No.: 392,650

[22] Filed: Feb. 23, 1995

Related U.S. Application Data

[63] Continuation-in-part of Ser. No. 157,253, Nov. 26, 1993, abandoned.

[51] Int. Cl.⁶ ............................. C08K 3/22; C08L 31/02
[52] U.S. Cl. ........................ 524/437; 525/261; 525/302; 525/309
[58] Field of Search ............................ 524/437; 525/261, 525/302, 309

[56] References Cited

U.S. PATENT DOCUMENTS

| | | | |
|---|---|---|---|
| 3,154,600 | 10/1964 | Munn | 260/884 |
| 3,847,865 | 11/1974 | Duggins | 260/42.52 |
| 4,085,246 | 4/1978 | Buser et al. | 428/220 |
| 4,183,991 | 1/1980 | Smiley et al. | 428/220 |
| 4,267,229 | 5/1981 | Knight et al. | 428/324 |
| 4,608,291 | 8/1986 | Gove | 428/119 |
| 4,803,026 | 2/1989 | Ikeda et al. | 264/216 |
| 5,244,941 | 9/1993 | Bruckbauer et al. | 523/171 |

*Primary Examiner*—Melvyn I. Marquis
*Assistant Examiner*—D. Aylward
*Attorney, Agent, or Firm*—William L. Krayer; Robert R. Gavlik

[57] ABSTRACT

Ranges of chain-transfer agents, thixotropic agents, and alumina trihydrate content are balanced to minimize migration or maldistribution of coloring matter and alumina trihydrate during curing of methyl methacrylate in a syrup including polymethylmethacrylate and also during subsequent heating and deformation in thermoforming, to achieve constancy of impact resistance and improve stability of patterns even in deformed portions of formed sheets.

4 Claims, 1 Drawing Sheet

ACRYLIC SHEET HAVING UNIFORM DISTRIBUTION OF COLORING AND MINERAL FILLER BEFORE AND AFTER THERMOFORMING

RELATED APPLICATION

This application is a continuation-in-part of our application of the same title, Ser. No. 157,253, filed Nov. 26, 1993, now abandoned.

TECHNICAL FIELD

This invention relates to the manufacture of acrylic sheet or slabs, that is sheets or slabs of polymethylmethacrylate ("PMMA"), of the type usable in or designed for architectural uses such as kitchen countertops and more complex shapes. The sheets or slabs contain significant amounts of flame retardant minerals, typically alumina trihydrate, and almost always have colorants in them, frequently in imitation of natural minerals such as onyx, marble or similar synthetic appearing solid color or patterned types having no visibly distinguishable particles. This invention describes a sheet that can be heated and bent at a sharp 90° angle and/or that can be heated and vacuum formed into shapes like sinks and bowls without a significant esthetic sacrifice. In addition, the sheets or slabs of this invention display specific physical and other properties, like low flammability and minimal color changes after thermoforming; the uniform distribution of flame retardant significantly improves the consistency of impact resistance.

BACKGROUND OF THE INVENTION

Sheets and slabs of synthetic mineral appearing material are now commonly used as kitchen countertops and interior and exterior decorative coverings of all kinds for buildings such as banks, air terminals, stores, and the like. Such applications frequently require that the material be fabricated to fit custom designed areas, requiring in turn that the slabs or sheets be butted together or otherwise joined in ways that juxtapose a cross section with a normal surface at 90°.

The fabrication process requires extensive time and specially trained craftsmen to be completed successfully, since special tools and procedures are necessary. If a shaped, one piece part of continuous or monolithic material is desired, such a part can only be produced by casting it in a mold cavity under special conditions. In addition to the high costs of such a process and for the installation of the parts (fitting, gluing it in place to a flat sheet, and/or finishing, for example,) there are often color differences between the cast bowl, for example, and the flat slab of the same material.

The sheet (the terms "sheet" and "slab" will be used interchangeably herein) of our invention can provide a relatively complex finished part by a simple thermoforming operation—that is, the sheet is heated and then pulled by vacuum into a concave cavity (or convex) mold, where it is allowed to cool, to retain its new shape. Such a mold can be shaped as a vanity top, with one 90° back splash wall, with a front end bull nose of 1.0 inch radius and a vanity type bowl. After forming, cooling and trimming, the part can be installed directly in place, without additional fabrication required.

Only one contemporary commercial product ("Corian" by DuPont) is said to be capable of being heat bent. However, its performance is not suitable, for example, to make 90° angle back splash wall, since the minimum radius of curvature specified by the "Corian" literature of which we are aware is 3.0 inches.

So far as we are aware, the use of alumina trihydrate in polymethylmethacrylate ("PMMA") articles was first proposed by Stevens et al in U.S. Pat. No. 3,563,939 (col. 4, lines 28–29) and Duggins in Canadian Patent 916,337. Its flame retardant properties are now well known and accepted, and alumina trihydrate ("ATH") is now widely used as a filler in various resinous products. Somewhat more detail for the construction of synthetic mineral products is provided by Duggins in U.S. Pat. No. 3,847,865; crosslinking agents are mentioned, for example. Also proposed are mold release agents, and viscosity reducers such as aliphatic acids.

Buser et al, in U.S. Pat. Nos. 4,085,246 and 4,159,301 address the problem of the settling rates of various particles used in making a simulated granite having a matrix of polymerizable methyl methacrylate ("MMA") having PMMA dissolved in it. See column 7, lines 42–62 of the '301 patent. They use the PMMA to adjust viscosity, which in turn controls the settling rates of the larger particles —see the Examples, particularly Example 5 of U.S. Pat. No. 4,159,301, lines 31–34. They also use chain-transfer agents as accelerators for the polymerization—col. 8, lines 58–68 of the same patent.

Uniformity of color is mentioned as a goal in Gavin et al U.S. Pat. No. 4,413,089, wherein iron oxide pigment of 10 microns or less is uniformly distributed in a syrup of MMA/PMMA which is then cured; prolonged storage of the syrup is not recommended (col. 2, lines 50–64).

In addition to meeting the above-described challenges, a material destined for use as a kitchen countertop, for example, should have a surface which is easily repairable and restored to its original appearance, such as by sanding and polishing, be protected against flammability, and have good temperature resistance in spite of being thermoformable.

The prior art has more or less neglected the goal of thermoformability or thermobending of solid surface sheets, since the prior art products were generally designed for reproducing the look of flat, natural, mineral based sheets.

SUMMARY OF THE INVENTION

Figure 1A:
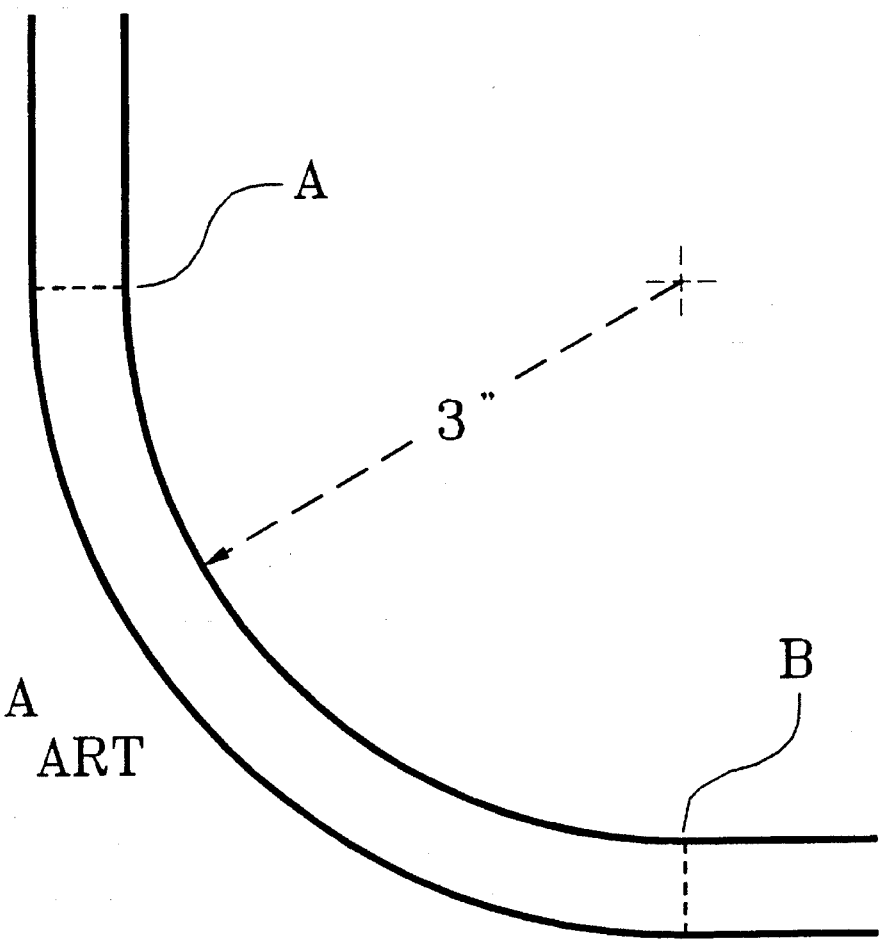
FIG. 1A is a more or less hypothetical illustration of a prior art bending of a sheet of "Corian" one-half inch thick.

The present invention addresses the making of mineral filled PMMA sheets that:

can be heat bent at relatively sharp angles, can be thermoformed into shaped articles without losing the uniform appearance and properties of the top surface, can be thermoformed by vacuum into a single-profile mold, concave or convex, and do not require two matching molds, have only minor and tolerable color changes across the whole finished part, either less than Delta E=2.0 by Cielab or not easily discernible by the human eye, have a thermoforming temperature low enough to avoid any significant loss of water from ATH filler during thermoforming, as is often the case for other thermoplastic materials, have a Flame Spread Index, by the ASTM E-84 Tunnel Test, lower than 75 and a Smoke Index of 350 or less, have the same impact resistance, by a falling weight method, measured from both the top side and the bottom side.

Our invention provides for the stability of the suspension of alumina trihydrate in a syrup of methyl methacrylate having polymethylmethacrylate dissolved in it by maintaining the following ingredients within the indicated ranges (by weight):

Content of PMMA dissolved in MMA/other monomers: 0–30% weight, preferably 10–25%.

ATH in the entire composition: 20–60% by weight, preferably 25–40%.

Thixotropic agent (preferably fumed silica) in the monomer/syrup fraction of the mixture:
0.10–3.5% or as much as necessary to obtain a viscosity of 1,000–10,000 centipoise (preferably about 2,000–5,000 centipoise) after mixing and measured by Brookfield Viscometer Model RVTDV-II, Spindle No. 2, 10 RPM.

Crosslinking agent as % weight of the total monomers content: 0.01–1.0% when using ethylene glycol dimethacrylate.

Chain-transfer agent as % weight of the total monomers content: When the crosslinker is present from 0.01 to 0.5%, no less than 0.01%; when the crosslinker is present from 0.5% to 1%, no less than (0.58–0.28) where x is the crosslinker in parts per hundred with respect to the total monomers content, but in any event the chain transfer agent should not be present in amounts more than 1.2 times the concentration of crosslinker. This amount may be adjusted to somewhat more or less when using chain-transfer agents other than n-dodecyl mercaptan. A convenient way to compare the effects of chain-transfer agents is to compare molecular weights obtained by polymerizing MMA in the presence of the chain-transfer agent and the absence of crosslinkers. The $MW_m$ and $MW_n$ should be similar to that obtained by 01–0.5% n-dodecyl mercaptan.

In addition to the above-identified ingredients, dyes and pigments may be present, polymerization initiators will be necessary, and other conventional ingredients may be used as are known in the art.

However, we do not employ particulates which are visibly distinguishable in the finished product. Most synthetic granites contain visibly distinguishable particles of various compositions and colors ranging from about 150 to 500 microns—that is, they will pass through a sieve having openings of 500 microns and be retained on one having openings of 150 microns (although larger particles are not uncommon in the synthetic mineral art). We have found that our objective of even distribution of particles can be frustrated through the use of such larger particles of various compositions, and accordingly, we restrict our particle size to particles smaller than those which will be retained on a sieve having openings of 90 microns, and preferably smaller than those which will be retained on a sieve having openings of 60 microns. These specifications for particle size apply in our invention to particulates of any composition or function—mineral flame retardants such as ATH, for example, or synthetic resin or other fillers.

The above-listed ingredients may be further described as follows:

PMMA as used herein is polymethylmethacrylate having a (weight average) molecular weight range of about 30,000 to about 600,000 having no crosslinked polymer chains, in order to remain soluble in MMA. It is typically made in situ by partial polymerization of methyl methacrylate, but can be pre-polymerized and dissolved in the MMA.

MMA is methyl methacrylate. The syrup is described herein as comprising PMMA dissolved in monomers comprising at least about 60% MMA, and preferably at least about 80% MMA, but of course the crosslinking agent, chain terminator, initiator, and thixotropic agent are also present in the amounts indicated herein as well as variable amounts of dyes and/or pigments; in addition, small amounts of other, optional, copolymerizable monomers, notably butyl acrylate, may be present in the syrup as is known in the art. We prefer to use a syrup which contains about 15% to about 25% PMMA. References to syrup herein and to MMA should be understood possibly to include such additional materials.

Alumina trihydrate is well known in the art of synthetic mineral manufacture. In the examples, we used it in a particulate size range of about 9 microns average, but the particulate size may vary widely. As noted above, the ATH as well as any other particles which are potentially visually distinguishable (if large enough) in the finished product should be able to pass through a sieve having openings of 90 microns, and preferably will pass through a sieve having openings of 60 microns, in order to assure that they will not be visually distinguishable. In quantity, the ATH may vary from about 20% to about 60% weight (preferably 25% to 50%) of the finished product.

Our invention comtemplates a solid surface material with the somewhat glossy appearance of the acrylic matrix in which may be seen the effects of the particulates no greater than 90 microns across. Our material is not simulative of granite, in that it is not coarse-grained, as granite is sometimes described. Rather, if the effects of the particulates in our material can be discerned at all, it may be described as substantially fine-grained (which we define specifically as having grains or particles less than 90 microns—that is, having no individually visibly discernable particles greater than 90 microns). We intend for the term "substantially fine-grained" to include materials in which no grains or particles are individually visibly discernable.

Any number of crosslinking agents, di-functional or tri-functional, may be used. Examples for suitable crosslinkers are ethylene glycol dimethylacrylate, propylene dimethylacrylate, polyethylene-glycol dimethylacrylate, propylene dimethylacrylate, polyethylene-glycol dimethylacryalate, divinyl benzene, diallyl phthalate, 1,3-butanediolmethacrylate, 1,4-butane ethylene glycol dimethacrylate or neopentyl glycol dimethacrylate as di-functional crosslinkers and tri-methylol propane trimethacrylate, triallyl cyanurate, pentaerythritol tetramethacrylate, allylmethacrylate, hydroxyethylmethacrylate or hydroxypropylmethacrylate as tri-functional crosslinkers. Most suitably, ethylene glycol dimethacrylate is preferred. The crosslinking agents are maintained in low concentrations, specifically about 0.01 to about 0.6 mole percent of di-functional crosslinkers based on the MMA in the syrup, or, as a component of the finished product, based on the crosslinked polymer. The combination of low concentrations of crosslinking agents with the proper amount of chain terminator assures the appropriate polymeric network most amenable to thermoformability.

Chain terminators or chain-transfer agents, such as octyl mercaptan, iso-dodecyl mercaptan, thiurams, dithiocarbarumates, dipentene dimercaptan, 2-mercapts ethanol, allyl mercapts-acetates, ethylene glycol dimercapts-acetate, trimethylolethane trithioglycolate, pentaerythritol tetrathioglycolate, normally serve the function of regulating the molecular weight of the polymerizing MMA, which in turn is known to affect the plastic behavior of polymerized mixture. In accordance with our method, chain terminators or chain-transfer agents are used to regulate the length of the polymer chains and thus to obtain the most suitable polymer matrix for thermoformability, as will be seen by the data in Example 3. They should be used in amounts from 0.01 to 0.7% weight of the total monomers present when using n-dodecyl mercaptan.

While we may use a conventional thickening agent as well as a thixotropic agent, the thixotropic agents we use are shown herein to be particularly suited for present purposes. They appear to enhance the inertial tendency of a particle to remain stationary in the matrix suspension. We prefer to use fumed silica. By fumed silica we identify the product formed by the hydrolysis of silicon tetrachloride vapor in a flame of hydrogen and oxygen, to produce solid particles in the range 7–30 millimicrons. Many different types of fumed silica are available. To conduct the bulk of our experimentation, we selected CAB-O-Sil M5, which has a surface area of 200 sq.meter/gram. However, any conventional fumed silica will have a beneficial effect in our invention.

The surface of fumed silica is hydrophilic since it has an abundance of hydroxyl groups, which makes it capable of hydrogen bonding with suitable molecules. Absorbed moisture in the silica or in the other components has a gross effect on the final viscosity of suspensions containing fumed silica and normally it lowers it. The same effect is given by other substances which may be more or less capable of developing hydrogen bonding.

If the fumed silica and/or the ATH are dried to eliminate the adsorbed moisture, the final viscosity of the suspension will be higher than when using the commercial products directly from the containers in which they are sold. Drying of the ATH above 200° F. may defeat its primary utility as a flame retardant by depleting its water content.

In our preferred compositions, the amount of fumed silica is selected so that the preferred viscosity is obtained, regardless of variations in the other ingredients.

The preferred method of obtaining a desired viscosity is the following:

A. Mix all the ingredients (MMA, PMMA, ATH, pigments, other additives, catalysts, chain-transfer agent, and crosslinking agent) of the formulation except the fumed silica and measure the viscosity as indicated below. If necessary, adjust the MMA (monomer) content of the syrup to obtain a viscosity of 800 to 1,500 centipoise.

B. Repeat step A including an amount of fumed silica and measure the viscosity.

C. Repeat step B to bring the viscosity to a level between 1,000 and 10,000 centipoise, preferably between 2,000 and 5,000 centipoise.

As indicated previously, the stability of our syrup is considered important, and this is especially so where the sheet or slab is formed in a continuous steel belt forming machine such as described in Hellsund's U.S. Pat. No. 3,371,383 and Opel's U.S. Pat. No. 3,376,371, both of which are incorporated herein by reference in their entireties, as these references represent our preferred procedure. While the forming of sheets or slabs between two moving continuous steel belts is the preferred procedure, it is important to realize that such machines are necessarily prone to vibration and microadjustments which tend to result in an almost unavoidable jostling of the particulates in the syrup; the concentrations of crosslinker, chain terminator, fumed silica, and PMMA prepolymer are important in stabilizing the ATH and/or other solids contributing to an evenly distributed fine-grained appearance.

DETAILED DESCRIPTION OF THE INVENTION

Our invention is described in more detail below.

FIG. 1A is a more or less hypothetical illustration of a prior art bending of a sheet of "Corian" one-half inch thick.

Figure 1B:
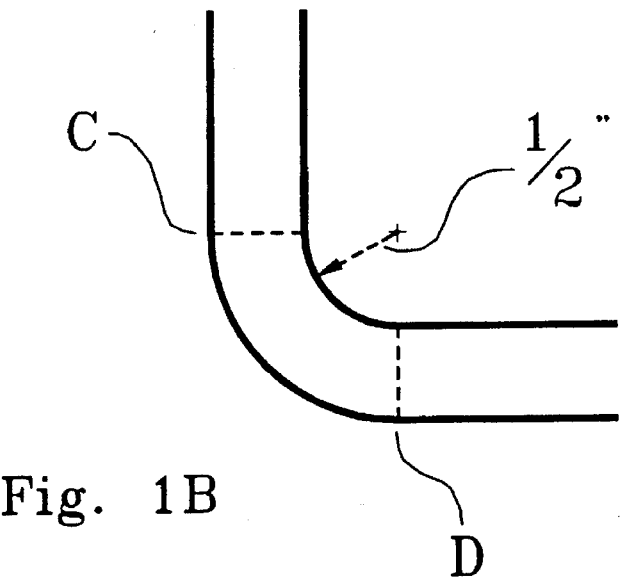
FIG. 1B is a similar idealized illustration of the bending of a sheet of the present invention.

FIG. 1B is a similar idealized illustration of the bending of a sheet of the present invention.

Referring now to FIG. 1A, the recommended (DuPont "Corian" Technical Bulletin CTDC-110, October, 1987) minimum bending radius of three inches for a prior art one-half inch thick flat sheet is illustrated as the radius of the bend in the inside curve from vertical extension point A to horizontal extension point B. Applying the simple formula $C=\Pi D$, the circumference of a hypothetical three-inch circle would be 18.8496 inches, and the quarter circle AB would measure 4.7124 inches. Applying the same formula to the outside curve for a sheet 0.5 inch thick, i.e. using a radius of 3.5, yields a quarter circle of 5.4953, a difference of 16.6% from the inside curvature. Such a distortion will tend to cause a flow of heated ingredients from the compressed inside curve to the expanded outside, and lengthwise toward points A and B from the curved portion. The flow of ingredients has a tendency to distort the visual or decorative pattern; accordingly, the prior art has minimized the disruptions of the material by using a relatively large radius for the curvature, eg. 3 inches.

FIG. 1B illustrates the achievable curvature of a sheet of the present invention, wherein the radius of the curve is one-half inch rather than the three inches of the section of FIG. 1A. In this case, the theoretical circumference of the outside of the curved section CD is 100% greater than that of the inside of the curve. It is readily seen that by enabling such a forming ability, the present invention overcomes a more severe displacement of material in relatively less volume. The relatively more severe displacement of material means a greater potential for distortion of the esthetic pattern, but we avoid or neutralize such distortion and so achieve a continuity of pattern heretofore not achievable under the stress of thermoforming.

A test has been devised to evaluate thermoformability, which is a primary object of the present invention. The test consists of clamping a flat test specimen 4⅞ square having the desired thickness onto a steel plate in which has been drilled a 3-inch diameter hole; then a polished stainless steel plunger having a one-inch radius is lowered at a rate of five inches per minute regardless of the resistance. The apparatus and sample are heated prior to the test to the desired temperature. As the plunger moves, a load cell generates a signal representing the amount of resistance in pounds, which may be recorded. At the moment the specimen ruptures, the plunger is stopped and the distance it has traveled is measured. Averaging of tests from four specimens of each sample is recommended. This test may be referred to herein as TP-0085.

EXAMPLE 1

A syrup was made by partial polymerization of MMA to obtain a viscosity of 3 poise and a PMMA content in MMA of 20% by weight. In a vacuum rated vessel, 1,500 lbs. of ATH OE-431 (by Solem) were added, under agitation, to a mixture of 2,194 lbs. of the syrup, 47 lbs. of additional MMA and 4,253 g of a wetting agent for the ATH.

The mixture was agitated for 90 minutes under vacuum, while adding 2,024 g of n-dodecyl mercaptan, 2,296 g of ethylene glycol dimethacrylate and the necessary catalysts, pigments and additives to polymerize the mixture in a continuous casting machine, as described by Hellsund in U.S. Pat. No. 3,371,383 and Opel in U.S. Pat. No. 3,376,371, into a 0.500" sheet.

The 2024 g n-dodecyl mercaptan represented 0.247% chain terminator based by weight on the available MMA monomer; 2,296 g ethylene glycol dimethacrylate represented 0.280% crosslinker based by weight on the available MMA monomer.

After complete curing, the one-half inch thick product was cut into four square specimens as required by the above-described test procedure TP-0085 and was tested for thermoformability, along with four specimens each of the commercial materials indicated in Table I. Results reported are the averages of the four specimens in each case.

TABLE I

| Tradename/Color | Sold By | Polymer Matrix | TP-0085; 40 min/340° F. | |
|---|---|---|---|---|
| | | | Inches at Break | Lbs. Force at Break |
| Corian/Cameo | DuPont | PMMA | .75 | 160 |
| Avonite Class I | Avonite | Polyester | 0.2* | 88* |
| Surell/Frost | Formica | Polyester | 0.2* | 258* |
| Formstone/ Porcelain | Avonite | PMMA | 1.6 | 283 |
| TFA Sample 2404** | Ex. No. 1 | PMMA | 7.5 | 93.5 |

(*)The test specimens did not stretch and shattered under load.
(**)Made according to the invention.

It will be seen from the above results that the polyester materials, Avonite Class I and Surell/Frost, were quite brittle and broke into small pieces. The Formstone PMMA from Avonite and the Corian PMMA were also rather unyielding and not at all suitable for the thermoforming into convex or concave molds by vacuum.

Thermoforming Example No. 1

Part A

A separate piece of 0.500" thick sheet produced in Example 1 was identified as TFA Sample 2404 and was thermoformed in a sink vanity mold of overall dimensions 17½"×28⅛", where the opening of the sink was about 10⅛"×15⅜" and the deepest part of the sink was about 6⅛" from the flat surface. The flat surface formed a bull nose with a curvature of 5/32" of radius in the front and had a 90° back splash wall of about 5" of height, with a curvature radius at the 90° bend of ½".

Thermoforming tests were performed by heating a sheet to the desired temperature in a standard vacuum thermoforming machine with top and bottom side heater banks. Once the sheet reached the desired temperature, it was lowered into the concave sink mold and vacuum was applied to pull the sheet onto the mold surfaces. A wide range of thermoforming temperatures was examined, at 10° F. intervals.

The best thermoforming temperature to obtain good details in the finished part was in the 300°–350° F. range.

Part B

TFA Sample 2404 was also tested by the thermoformability test TP-0085, described above, at the selected temperatures listed below. The results were:

| Temp. °F. | Inches at Break | Lbs. Force at Break |
|---|---|---|
| 290 | 6.0 | 215 |
| 300 | 6.7 | 179 |
| 310 | 6.9 | 171 |
| 320 | 7.2 | 139 |
| 330 | 7.5 | 105 |
| 340 | 7.5 | 94 |
| 350 | 4.7 | 49 |
| 360 | 4.2 | 30 |

The observations about the best thermoforming temperatures for molding sinks (300°–350° F.) correlate well with the "Inches at Break" results, as long as the force at break remains below about 225 lbs, preferably 200. This is important because in our preferred thermoforming arrangement, where the heated sheet is pulled by vacuum onto the convex or concave mold surface, it is desirable to accomplish the task at "partial vacuum pressures", that is 8–15 inches of vacuum rather than stronger vacuums. Our invention enables the use of far less stressful vacuums than otherwise may be the case, so that the lifetime of the mold is significantly lengthened.

EXAMPLE 2

TFA samples were prepared with the same basic formulation of Example 1 and TFA Sample 2404, except for the amount of ATH, which was varied as listed below. The polymer matrix (MMA, I-3, syrup, chain transfer and crosslinking agents, catalysts, etc.) was adjusted accordingly to compensate for the increase or decrease in the amount of ATH. See Thermoforming Example No. 2 for the amounts of ATH used.

Thermoforming Example No. 2

The samples listed below were prepared as described in Example 2 and were tested according to TP-0085 at 340° F. for 40 minutes and per ASTM E-84 Tunnel Test. In the E-84 test, the F.S.I. value is the Flame Spread Index and the S.I. is the Smoke Index. The results show how increasing amounts of ATH and the corresponding decreasing amounts of polymer matrix do not significantly affect the heat distortion temperature and the thermoforming characteristics, but they do affect the Flame Spread Index (F.S.I.) and the Smoke Index (S.I.).

| Sample I.D. | % ATH | H.D.T.(*) | TP-0085; 40 min/340° F. | | ASTM E-84 | |
|---|---|---|---|---|---|---|
| | | | Inches at Break | Lbs. Force at Break | F.S.I. | S.I. |
| TFA No. 2485 | 30 | 205 | 6.3 | 127 | 65 | 100 |
| TFA No. 2404 | 40 | 209 | 7.5 | 94 | 50 | 85 |
| TFA No. 2405 | 45 | 207 | 7.4 | 107 | 40 | 80 |
| TFA No. 2406 | 50 | 209 | 5.1 | 102 | 35 | 65 |

(*)H.D.T. is the Heat Distortion Temperature, in degrees Fahrenheit, at 264 psi, measured per ASTM D-648.

EXAMPLE 3

A formulation similar to the one described in Example 1 was prepared in the laboratory and poured between two casting plates made of stainless steel, to produce 12"×12" sheets of 0.500" thickness after curing. The curing was obtained by dipping the stainless steel plate assembly into a water tank kept at 180° F. for one hour and then into an air circulating oven, kept at 250° F., for one hour. This was done to evaluate laboratory prepared formulations in which variations of the amount of chain transfer (n-dodecyl mercaptan) and crosslinking agents (ethylene glycol dimethacrylate) were made.

The formulation consisted of 45 parts of Solem OE-431ATH having an average size of 9 microns, added under agitation to a mixture of 52 parts of syrup (the syrup was MMA containing about 20% PMMA), 2.75 parts of additional MMA, and 0.25 parts of a wetting agent for the ATH. To the mixture were added various amounts of chain-transfer agent (n-dodecyl mercaptan) and crosslinking agent (ethylene glycol dimethacrylate) in the quantities shown in the table listed in Thermoforming Example No. 3. These quantities are listed in parts per hundred over the total amount of methyl methacrylate in the formulation.

After addition of catalysts, pigments, additives, and deaeration under vacuum, to avoid bubbles in the sheet, the mixture was polymerized between casting plates as indicated above.

Thermoforming Example No. 3

A number of samples prepared as described in Example No. 1 in 0.500" thickness, were tested by the thermoforming test method TP-0085, 40 minutes at 340° F. The details of the compositions and the results are listed below:

| Sample ID | Chain(*) Transfer | Crosslinker(*) | Inches at Break | Lbs. at Break |
| --- | --- | --- | --- | --- |
| 33A | .127 | .289 | 5.2 | 133 |
| 33B | 0 | .289 | 4.5 | 192 |
| 33C | .252 | .577 | 5.9 | 163 |
| 33D | .252 | .866 | 3.8 | 220 |
| 33E | .503 | .866 | 5.8 | 154 |
| 43A | .252 | .289 | 8.0 | 123 |
| 43B | .379 | .289 | 4.5(**) | 35 |
| 43C | .379 | .145 | 4.7 | 140 |
| 43D | .252 | .245 | 3.1(**) | 17 |
| 43E | .252 | .072 | 3.5(**) | 6 |

(*)Parts per hundred on the methyl methacrylate of the formulation.
(**)These samples exhibited moderate to severe swelling, indicating degradation of the polymer matrix.

From this table it will be seen that the best results were obtained at the Sample 43A levels of chain-transfer and crosslinking agent. In general, increasing amounts of crosslinker increase the force needed for the forming. This is demonstrated well by samples 43A, 33C, and 33D. Some chain-transfer agent is better than none: see Samples 33A, 33B and 43A. Larger amounts of both may provide satisfactory results, but the amount of stretch available is limited, see Samples 33E and 43A. When the amount of chain-transfer agent is too high, severe degradation may take place, see Samples 43B and 43A. Sample 43C did not exhibit the severe degradation of Sample 43B, but it did not appear to possess a sufficient thermal stability and would not be recommended. If the amount of crosslinker is too low, the preferred level of chain-transfer agent may be relatively too high and cause gross thermal degradation, as shown by Samples 43D and 43E against Sample 43A.

We therefore use about 0.01 mole percent to about 0.6 mole percent di-functional crosslinker per mole of methyl methacrylate (MMA) and other monomer (preferably about 0.15 to about 0.5), and about 0.01 to about 0.5 parts by weight chain-transfer agent per 100 parts MMA monomer, preferably about 0.01 to abut 0.3 parts per hundred.

EXAMPLE 4

The samples described in Example 2 and Thermoforming Example No. 2 were heated in an oven with forced air circulation. Other specimens of the same samples were thermoformed using a square box mold, concave configuration, of such dimensions that the flat section of the thermoformed part was half of the thickness of the original sample. The Delta E color difference of the thermoformed sample was measured in Cielab units against the corresponding samples which had been heated only. Note: The Cielab color system is the commonly used name for the CIE 1976 L*a*b* system. We used a spectrophotometer SpectraSensor II, by ACS.

| Sample I.D. | Color | Delta E (A) | Delta E (B) |
| --- | --- | --- | --- |
| TFA No. 2485 | Cameo | 1.8 | 3.3 |
| TFA No. 2404 | Porcelain | 1.4 | 1.8 |
| TFA No. 2405 | Cameo | 2.0 | 2.8 |
| TFA No. 2406 | Almond | 4.6 | 6.2 |

(A) Heated 20 mins. at 340° F.
(B) Heated 30 mins. at 340° F.

Comment: When Delta E is higher than 2.0, the human eye may perceive a color change that makes the part unacceptable. The color change is more or less noticeable depending on the color of the part. The Delta E or color changes of the same thermoformed parts are proportional to the amount of time the sheet is heated—see the difference between data of (A) and (B) columns. They are also proportional to the amount of stretching or thinning of the sheets (data not shown) and to the initial color of the sheet: sample TFA 2406 changes much more than the other colors. Personal preference may dictate a case-by-case evaluation, depending on the color of the sheet, the heating time/source selected and the type of mold, but it is also evident that the sheets of our invention can be thermoformed into shapes where the maximum color difference remains below the level of 2.0 units in the Cielab system.

EXAMPLE 5

Sheet samples of 0.500" thickness were prepared by the laboratory method described in Example 3, from a basic formulation consisting of:

| | % Weight |
| --- | --- |
| ATH (Solem OE-431) | 40 |
| Syrup | 59.75 |
| BYK 1142 | .25 |
| n-dodecyl mercaptan | 0.138 phr(*) |
| ethylene glycol dimethacrylate | 0.157 phr(*) |
| catalysts | As needed |
| pigments | As needed |
| other additives | As needed |

(*)these amounts represent .289% and .328%, respectively, of the MMA present in the formulation.

Sample 5A was made as described above. Sample 5B had 0.5phr of Cab-O-Sil M5 (by Cabot Corporation) added to the mixture described above. Sample 5B exhibited a viscosity of 3,000 centipoise while sample 5A was rated at 1,060 centipoise. The measurements were obtained from a Brookfield Viscometer, Model RVTDV-II, Spindle No. 2, at 10 RPM.

The impact resistance in inches/lbs. was measured by ASTM D-3029 (Gardner method).

| Sample I.D. | Top Side Impact Resistance | Bottom Side Impact Resistance |
|---|---|---|
| 5A | 35.8 | 51.6 |
| 5B | 41.6 | 43.8 |

Achieving the same impact resistance on both sheet sides demonstrates that the material is homogeneous. If the ATH settles toward the bottom side of the sheet during its production process, the top surface side will be richer in polymer. This was the case with sample 5A. Under the conditions of the test, the initial rupture occurs on the lower side, and sample 5A displayed its relative weakness by failing when impacted on the top. When another sample of 5A was impacted on the ATH-rich side, the impact resistance was higher. But in the case of 5B, the sides had approximately equal results, demonstrating the invention.

We have thereby shown that the fumed silica is able to adjust the viscosity or thixotropicity of the completed syrup so the ingredients will remain evenly distributed throughout the thickness of the sheet during the relatively long curing period. As indicated elsewhere herein, an even distribution of ingredients over the cross-section or profile of a sheet or slab permits an esthetic continuity of pattern, color, or design when the sheet is manipulated by thermoforming or juxtaposed during fabrication. But uneven distribution does not necessarily result in undesirable mechanical thermoforming properties—that is, the presence of polymer-rich and ATH-rich sides of a sheet does not significantly adversely affect the TP-0085 test results, as may be seen elsewhere herein.

A preferred composition for its combined properties of composition uniformity and thermoformability, based on the results particularly of Examples 3 and 5 contains 0.2% to 0.35% chain-transfer agent, 0.25 to 0.4% crosslinking agent, and 0.2% to 1.5% fumed silica.

EXAMPLE 6

Sheet samples of 0.500" thickness were prepared by the laboratory method described in Example 3, from a basic formulation consisting of:

| | % Weight |
|---|---|
| ATH (Solem OE-431) | 40 |
| MMA/PMMA (20%) Syrup | 59.75 |
| BYK 1142 | .25 |
| n-dodecyl mercaptan | 0.119 phr(*) |
| ethylene glycol dimethacrylate | 0.135 phr(*) |
| catalysts | As needed |
| pigments | As needed |
| other additives | As needed |

(*)These amounts correspond to .249% and .282%, respectively, of the MMA present in the formulation.

Samples 6A, 6B, and 6C were made from the formulation above, with Epoxol 9.5 (epoxidized linseed oil produced by ACS, Inc.) added as indicated in the table below.

Samples 6D, 6E, and 6F were prepared from the same formulation above, but samples 6E and 6F included 2 phr (parts by weight per hundred) of Butyl Acrylate and 6F included 2 phr Butyl Acrylate plus 1.2 phr of Cab-O-Sil M5 fumed silica.

Samples 6G and 6H contained 2 and 4 phr, respectively, of Fyrol RDP, a flame retardant additive containing phosphorus and sold by AKZO Corporation.

| | | | TP-0085 | |
|---|---|---|---|---|
| Sample ID Thickness | Added phr of | HDT °F.(*) | Inches at Break | Lbs. Force at Break |
| | | | at 320° F./40 min. | |
| 6A/.500" | 4.2 of Epoxol 9.5 | 164.5 | 13.1 | 72 |
| 6B/.500" | 3.0 of Epoxol 9.5 | 183.9 | 11.5 | 99 |
| 6C/.500" | 1.8 of Epoxol 9.5 | 192.9 | 10.7 | 122 |
| | | | at 340° F./40 min. | |
| 6D/.400" | None | 207.1 | 7.8 | 76 |
| 6E/.400" | 2 of Butyl Acrylate | 197.2 | 6.4 | 87 |
| 6F/.400" | 2 of Butyl Acrylate & 1.2 of Cab-O-Sil M5 | 202.1 | 9.1 | 112 |
| 6G/.500" | 2 of Fyrol RDP | Not determined | 4.4 | 46 |
| 6H/.500" | 4 of Fyrol RDP | Not determined | 4.6 | 40 |

(*)Heat Distortion Temperature, at 264 psi, per ASTM D-648.

Examples 6A, 6B, and 6C show a higher degree of stretch of the sheet at a lower force.

In Examples 6D, 6E, and 6F the same is achieved by adding butyl acrylate, a comonomer chosen from those known to lower the Tg of PMMA, so that a given formulation will have a "more pliable polymer matrix" when the temperature and all other conditions are the same. In Examples 6G, 6H a commercial flame retardant added to the formulation shows how the thermoforming parameters can be modified while adding flame retardant additives which might be categorized as plasticizers.

Epoxol 9.5 is an epoxidized linseed oil, sold by Swift Chemical Company. Fyrol RDP is a bis-phosphate ester, containing 11% of phosphorus and it is sold by AKZO.

EXAMPLE 7

The effect of other fillers and different grades of ATH was examined by preparing 0.500' samples by the method described in Example 5 for sample 5A. A fine grade of ATH, Micral 1000 by Solem Corporation, average particle size 1 micron, was used in sample 7A. The ratio of MMA/syrup was adjusted to a higher level of MMA, to maintain a workable viscosity of the mixture before polymerization. In sample 7B, OE-431CM (by Solem Corporation), a surface treated grade of ATH was used.

In sample 7C, 10 parts of ATH were replaced by Calcium Carbonate, as a mixture made from 188 grams of $CaCO_3$, ACS grade by Fisher, and 42 grams of $CaCO_3$ #10 by Georgia Marble.

| | TP-0085 at 340° F./40 min. | |
|---|---|---|
| Sample I.D. | Inches at Break | Lbs. Force at Break |
| 7A | 4.7 | 143 |
| 7B | 4.3 | 37 |

-continued

| | TP-0085 at 340° F./40 min. | |
|---|---|---|
| Sample I.D. | Inches at Break | Lbs. Force at Break |
| 7C | 4.2 | 33 |

It is evident that other ATH types and other mineral fillers may be used and that satisfactory thermoforming properties are retained.

EXAMPLE 8

The addition of another polymer matrix material to the PMMA matrix was examined by adding a general purpose polyester resin (MR-12845, manufactured by Aristech Chemical Corporation) to the formulation described in Example 5A. The PE resin replaced the same amount of the MMA/syrup fraction.

| | | TP-0085 at 340° F./40 min. | |
|---|---|---|---|
| Sample I.D. | % PE Resin | Inches at Break | Lbs. Force at Break |
| 8A | 10 | 2.1 | 180 |
| 8B | 20 | .8 | 94 |

The addition of other monomer/polymer systems will affect the degree of thermoformability depending on the type of polymer backbone used. Large amounts of a thermoset resin, as the one used above, may reduce the degree of thermoformability, but it may provide for a higher service life temperature of the part to be made.

We claim:

1. A composition for making thermoformable sheet or slab comprising
   (a) a syrup comprising methyl methacrylate having dissolved within it about 10% to about 25% uncrosslinked polymethylmethacrylate, said syrup having dispersed within it y parts by weight chain terminator per hundred parts by weight of methylmethacrylate and 0.01 to 1.0 parts by weight crosslinking agent where x is the amount of crosslinking agent and
   y is no greater than x +0.2 and
   when x is 0.01 to 0.5, y is no less than 0.01 and
   when x is 0.5 to 1.0, y is no less than (0.58x−0.28), and
   (b) solid particulates which will pass through a sieve having openings of 90 microns, said solid particulates comprising about 20% to about 60%, based on the weight of the final composition, alumina trihydrate, and wherein a one-half inch thick, flat thermoformable sheet or slab made from said composition will have a minimum bending radius of less than three inches.

2. Composition of claim 1 wherein x is a number from 0.25 to 0.4.

3. Composition of claim 1 wherein y is a number from 0.2 to 0.35.

4. Composition of claim 1 wherein said solid particulates will pass through a sieve having openings of 60 microns.

* * * * *